(No Model.)
J. WEICHHART.
FEED CUTTING MACHINE.
No. 247,868. Patented Oct. 4, 1881.
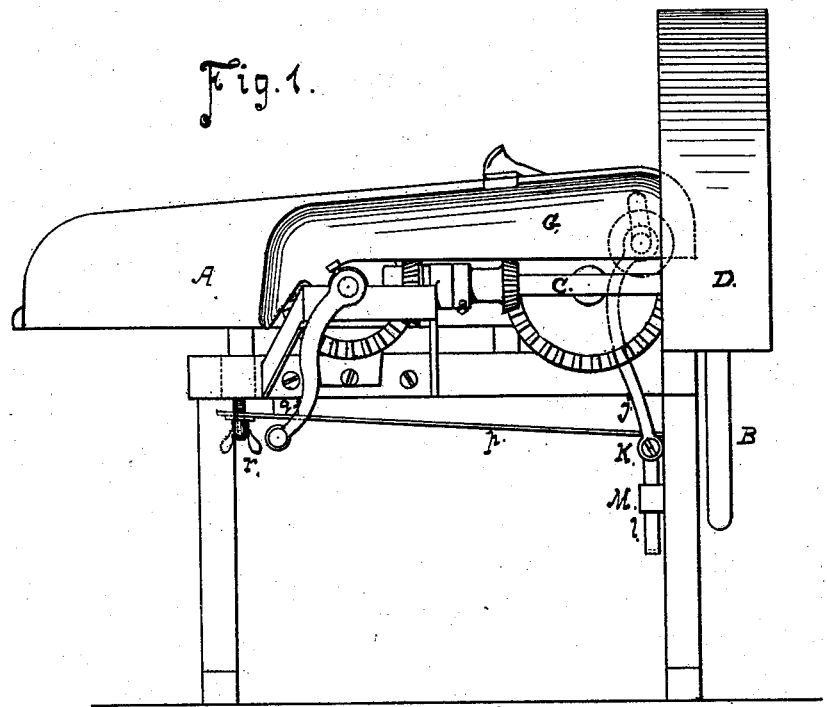
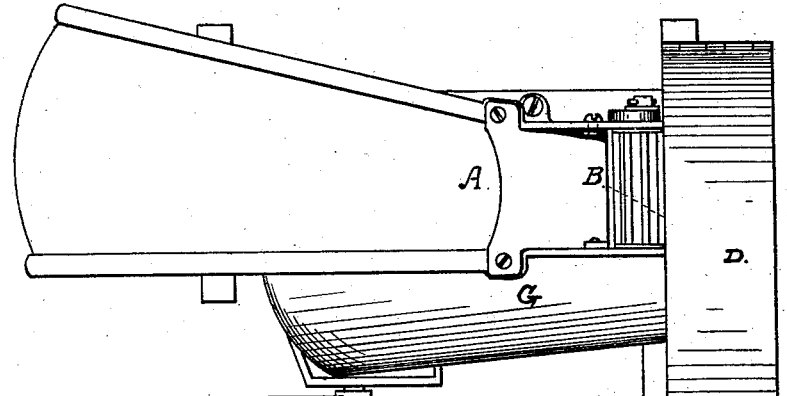
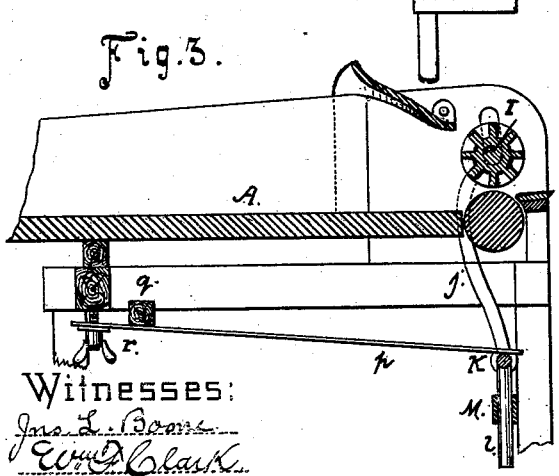
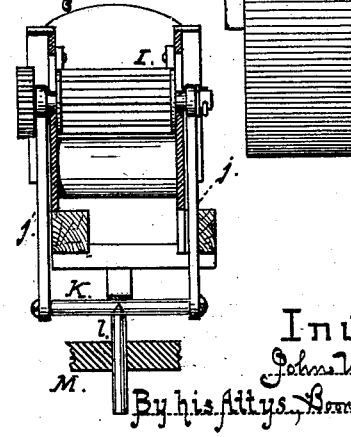
Witnesses:
Jno. L. Boone
E. W. D. Clark
Inventor:
John Weichhart
By his Att'ys, Boone & Boone

UNITED STATES PATENT OFFICE.

JOHN WEICHHART, OF SAN FRANCISCO, CALIFORNIA.

FEED-CUTTING MACHINE.

SPECIFICATION forming part of Letters Patent No. 247,868, dated October 4, 1881.

Application filed May 23, 1881. (No model.)

*To all whom it may concern:*

Be it known that I, JOHN WEICHHART, of the city and county of San Francisco, in the State of California, have invented certain new and useful Improvements in Feed-Cutting Boxes; and I do hereby declare that the following is a full, clear, and exact description thereof, reference being had to the accompanying drawings.

The improvements constituting my present invention relate more particularly to the feed-cutter for which Letters Patent No. 225,671 were issued to me on the 16th day of March, 1880; but they can also be applied to other feed-cutters.

My improvement relates to a novel and improved tension device for the upper feed-roller, all as hereinafter more fully described.

Referring to the accompanying drawings, Figure 1 is a side elevation of a cutter with my improvements applied thereto. Fig. 2 is a top view. Fig. 3 is a longitudinal section. Fig. 4 is a cross-section, these two sections being taken vertically.

Let A represent the feed-box, and B the cutting-wheel, that is mounted on a shaft, C, so as to rotate across the end of the box, and to the spokes of which the cutting-knives are secured. Over the upper half of this wheel I place a semicircular box, D, inside of which the upper part of the wheel will rotate. In the side of this box opposite the end of the cutting-box A, I make an opening, through which the straw can pass to the cutting-wheel. This box can be hinged at one side, so as to shut down over the wheel, or it can be independent, so as to be removed entirely when desired. In either case it forms a guard or housing that prevents accidents.

The gearing and mechanism through which the wheel is rotated are secured to the side of the box, and is liable to be clogged by straw getting into it. To prevent this I place a housing or shield, G, over it, as shown, so that the gearing is concealed and protected. By means of these two housings I completely cover up those parts of the machine that are liable to give trouble or cause accidents to the limbs of persons who are operating or moving around it.

To provide a spring-tension for the upper feed-roll, I, I connect an arm, $j$, with each of its journals outside of the slot in the sides of the box in which the journals move. These arms extend down on each side of the box, and their lower ends are connected by a cross-bar, K, which passes across underneath the box. A pin, $l$, projects downward from the middle of this cross-bar, and passes through a hole in the timber M, underneath the cross-bar, and serves as a guide for the arms and cross-bar. A flat spring, $p$, then passes along under the box, its spring end resting upon the cross-bar K, while its opposite end passes below a cross-bar or cleat, $q$, near the rear end of the box. A set-screw, $r$, then passes through a hole in its rear extremity and into the under side of the box, and serves, by turning it in or out, to increase or diminish the pressure of the opposite end of the spring upon the cross-bar.

The guide-pin $l$ might be dispensed with; but I prefer to employ it, as it renders the movement of the roller more positive.

This is a very simple arrangement, and one that will not get out of order. It permits a vertical movement of the upper feed-roll, and its action is steady and uniform; and, besides, it is easily and cheaply supplied.

Having thus described my invention, what I claim, and desire to secure by Letters Patent, is—

In a feed-cutting box, the automatic tension for regulating the pressure of the upper feed-roll, consisting of the arms $j$ and cross-bar K, having the guiding-rod $l$, passing through the cross-piece M, combined with the spring $p$, fulcrumed on the cross-bar $g$, its spring end resting on the bar K, while its opposite end is secured to the box by the set-screw $r$, substantially as described.

In witness whereof I have hereunto set my hand and seal.

JOHN WEICHHART. [L. S.]

Attest:
 W. F. CLARK,
 JNO. L. BOONE.